United States Patent
Erdmann et al.

(10) Patent No.: US 9,658,840 B2
(45) Date of Patent: May 23, 2017

(54) COMPILER AND COMPILING METHOD FOR A NETWORKED CONTROL SYSTEM COMPRISING A PLURALITY OF DEVICES

(75) Inventors: Bozena Erdmann, Aachen (DE); Armand Michel Marie Lelkens, Heerlen (NL); Oliver Schreyer, Herzogenrath (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 868 days.

(21) Appl. No.: 12/600,024

(22) PCT Filed: May 19, 2008

(86) PCT No.: PCT/IB2008/051954
§ 371 (c)(1),
(2), (4) Date: Nov. 13, 2009

(87) PCT Pub. No.: WO2008/142631
PCT Pub. Date: Nov. 27, 2008

(65) Prior Publication Data
US 2010/0306748 A1 Dec. 2, 2010

(30) Foreign Application Priority Data
May 22, 2007 (EP) .................................... 07108681

(51) Int. Cl.
*G06F 9/45* (2006.01)
(52) U.S. Cl.
CPC ....................... *G06F 8/45* (2013.01)
(58) Field of Classification Search
None
See application file for complete search history.

(56) References Cited

U.S. PATENT DOCUMENTS

| | | | |
|---|---|---|---|
| 5,241,652 A * | 8/1993 | Barabash et al. | 706/48 |
| 6,292,938 B1 * | 9/2001 | Sarkar | G06F 8/47 717/138 |

(Continued)

FOREIGN PATENT DOCUMENTS

| | | |
|---|---|---|
| JP | 2006344017 A | 12/2006 |
| JP | 2008140120 A | 6/2008 |

OTHER PUBLICATIONS

Paolo Baronti, Prashant Pillai, Vince W.C. Chook, Stefano Chessa, Alberto Gotta, Y. Fun Hu, Wireless sensor networks: A survey on the state of the art and the 802.15.4 and ZigBee standards, Computer Communications, vol. 30, Issue 7, May 26, 2007, pp. 1655-1695, ISSN 0140-3664.*

(Continued)

*Primary Examiner* — Matthew Brophy (57) ABSTRACT

The invention relates to a compiler and a method for compiling control logic for a plurality of devices of a networked control system, particularly to the automated assignment of control logic to devices. The invention provides with a compilation an automatic assignment procedure of an executable runtime code to devices of a networked control system. The assignment process of control logic to the devices may take various optimization criteria into account which include various distribution aspects, e.g. network resources or capabilities, such as available bandwidth or reliability of the network links, and device resources or capabilities, e.g. CPU, memory, power source or sleeping behavior which may influence the observed behavior of the devices, e.g. due to transmission delay or data packet loss.

12 Claims, 2 Drawing Sheets

(56) References Cited

U.S. PATENT DOCUMENTS

| | | | | |
|---|---|---|---|---|
| 6,618,856 | B2* | 9/2003 | Coburn | G05B 19/41885 700/86 |
| 6,708,331 | B1* | 3/2004 | Schwartz | G06F 8/452 717/160 |
| 6,983,463 | B1* | 1/2006 | Hunt | 719/316 |
| 7,509,244 | B1* | 3/2009 | Shakeri | G06F 9/5044 703/13 |
| 7,555,658 | B2* | 6/2009 | Vahid | H04Q 9/00 709/230 |
| 7,860,863 | B2* | 12/2010 | Bar-Or | G06F 8/433 707/736 |
| 8,191,052 | B2* | 5/2012 | Chamieh | G06F 9/4428 717/105 |
| 8,381,202 | B2* | 2/2013 | Papakipos | G06F 8/45 717/149 |
| 8,443,348 | B2* | 5/2013 | McGuire | G06F 8/45 312/200 |
| 8,683,163 | B2* | 3/2014 | Morfey | G06F 1/24 711/167 |
| 2002/0147505 | A1* | 10/2002 | Beck | G06F 8/41 700/18 |
| 2003/0196144 | A1* | 10/2003 | Swoboda | G06F 15/786 714/34 |
| 2004/0111715 | A1* | 6/2004 | Stone | 717/148 |
| 2005/0039173 | A1* | 2/2005 | Tondreau et al. | 717/136 |
| 2005/0081182 | A1* | 4/2005 | Minor et al. | 717/100 |
| 2006/0005173 | A1* | 1/2006 | Eng | G06F 17/5045 717/140 |
| 2006/0028212 | A1* | 2/2006 | Steiner | H05B 37/029 324/527 |
| 2006/0095893 | A1* | 5/2006 | Vahid et al. | 717/109 |
| 2007/0162482 | A1* | 7/2007 | Flaxer | G06Q 10/06 |
| 2007/0174828 | A1* | 7/2007 | O'Brien | G06F 8/451 717/151 |
| 2007/0251835 | A1* | 11/2007 | Mehta et al. | 205/783 |
| 2007/0258395 | A1* | 11/2007 | Jollota et al. | 370/310 |
| 2008/0080416 | A1* | 4/2008 | Park et al. | 370/328 |
| 2008/0133741 | A1 | 6/2008 | Kubota | |
| 2008/0134138 | A1* | 6/2008 | Chamieh | G06F 9/4428 717/105 |
| 2008/0274689 | A1* | 11/2008 | Kuban | H04L 1/16 455/7 |
| 2008/0291855 | A1* | 11/2008 | Bata et al. | 370/311 |
| 2008/0320247 | A1* | 12/2008 | Morfey | G06F 1/24 711/154 |
| 2009/0034433 | A1* | 2/2009 | Chegaray et al. | 370/255 |
| 2009/0055691 | A1* | 2/2009 | Ouksel et al. | 714/48 |
| 2010/0250007 | A1* | 9/2010 | Ballantyne | G05B 19/056 700/276 |

OTHER PUBLICATIONS

Welch, L.R.; Ravindran, B.; Henriques, J.; Hammer, D.K.; , "Metrics and techniques for automatic partitioning and assignment of object-based concurrent programs," Parallel and Distributed Processing, 1995. Proceedings. Seventh IEEE Symposium on , vol., No., pp. 440-447, Oct. 25-28, 1995 doi: 10.1109/SPDP.1995.530716.*

Jin-Shyan Lee; Yang-Chih Huang; , "ITRI ZBnode: A ZigBee/IEEE 802.15.4 Platform for Wireless Sensor Networks," Systems, Man and Cybernetics, 2006. SMC '06. IEEE International Conference on, vol. 2, No., pp. 1462-1467, Oct. 8-11, 2006.*

Zucatto, Fabio L., et al. "ZigBee for building control wireless sensor networks." Microwave and Optoelectronics Conference, 2007. IMOC 2007. SBMO/IEEE MTT-S International. IEEE, 2007.*

Waski et al "Scheme for Automatic Fine Grained Distribution of Software for Distributed Cooperative Collaboration", The 9th Workshop on Systems for Programming and Applications (SPA 2006), Japan Society for Software Science and Technology Software System Research Group.

Canal et al: "Dynamic Code Partitioning for Clustered Architectures"; Department D'Arquitectura de Computadors, Universitat Politecnica de Catalunya,, Barcelona, Spain, 10 Page Document.

* cited by examiner

COMPILER AND COMPILING METHOD FOR A NETWORKED CONTROL SYSTEM COMPRISING A PLURALITY OF DEVICES

The invention relates to a compiler and a method for compiling control logic for a plurality of devices of a networked control system, particularly to the automated assignment of control logic to devices.

Networking of devices is a ubiquitous trend in commercial, industrial and institutional business markets and also in consumer markets. Examples for networked control systems are building automation systems, e.g. for lighting, heating and ventilation or safety. A networked control system may consist of devices like light ballasts, switches, daylight or occupancy sensors, remote controllers, actuators, valves, thermostats or meters. The devices are preferably connected wirelessly i.e. via RF (radio frequency) technology. A control network may comprise a large number of devices. These devices may have small footprint; be installed in inaccessible places (e.g. light ballasts hidden in the ceiling), be resource-limited and there may potentially very complicated application logic to be run on these devices. These conditions require new approaches to control network management.

It is an object of the present invention to provide an improved compiler and compilation method for a networked control system comprising a plurality of devices.

The object is solved by the independent claim(s). Further embodiments are shown by the dependent claim(s).

The invention provides with a compilation an automatic assignment procedure of an executable runtime code to devices of a networked control system. The assignment process of control logic to the devices may take various optimization criteria into account which include various distribution aspects, e.g. network resources or capabilities, such as available bandwidth or reliability of the network links, and device resources or capabilities, e.g. CPU, memory, power source or sleeping behaviour which may influence the observed behaviour of the devices, e.g. due to transmission delay or data packet loss.

In the following, some important terms used herein are explained.

The term "networked control system" particularly means a system comprising a plurality of connected devices or even nodes. The devices may be connected by a communication system, for example a wireless communication system. The networked control system may be a complex lighting control system with occupancy and daylight sensors and pre-defined rules, e.g. for weekdays and weekends, working and after-work hours. The networked control system may also be a building automation system, a home control system, an atmosphere lighting system or any other control and automation environment, including industrial, retail, institutional and residential.

The term "device" may mean herein any device or node of the networked control system. The devices may comprise light ballasts, switches, (day)light or occupancy sensors, remote controllers, actuators, thermostats, valves, meters and/or additional devices, like (network) routers, bridges, gateways, aggregators and consoles. A device may provide control parameters or functions to the networked control system. A device typically comprises a device logic which may represent attributes of hardware or software states of the corresponding device and define a device state and local device functions. The device logic may be represented by device "state variables" representing attributes of the hardware and software state of the device. A state variable may be called "involved" in an executable code if the state variable is read or changed by the executable code. A state variable read by the executable code is an input state variable. A state variable changed by the executable code is an output state variable. A master device may be assigned to a state variable which means that during runtime the master device holds an instance of the state variable and the value of this instance will be treated as "master" value for the state variable. A device may be called "involved" in an executable code if it is the master of at least one state variable "involved" in the executable code.

The term "control logic" may define a device independent program which describes the runtime behaviour of one or a plurality of the devices. The control logic may basically consist of operations on the state variables formulated in a programming language.

The term "executable code" or executor may define a device specific software program being a translation of corresponding control logic. A runtime environment may be configured to execute the executable code. An execution of the executable code may allow controlling runtime behaviour of at least one device of the networked control system.

According to an embodiment of the invention, a compiler for a networked control system comprising a plurality of devices is provided, comprising:

means for partitioning a control logic into a plurality of functional control logic programs;

means for translating the plurality of functional control logic programs into a plurality of executable codes; and means for assigning the plurality of executable codes according to a placing rule to specified devices of the plurality of devices.

The means for partitioning may be configured to partition the control logic according to a partitioning rule which depends on the placing rule. This allows on optimal assignment of the executable codes and the corresponding control logic programs.

The specified device may be a device being involved in one of the plurality of executable codes. This allows placing the required functionality provided by the executable codes close to the devices which require the functionality.

The means for assigning may be configured to assign at least one of the plurality of executable codes to a specified device which hosts a master instance of a state variable involved in the at least one executable code. In particular, the state variable may be an output state variable of the executable code.

The means for assigning may be configured to assign the executable codes on specified devices comprising sufficient resources for executing the assigned executable codes. This allows preventing the executable code to be assigned on resource restricted devices.

Further, the means for assigning may comprise means for distinguishing a device comprising sufficient resources from a device comprising restricted resources and wherein the means for assigning may be configured to assign an executable code to a device comprising restricted resources only if there is no device comprising sufficient resources available. Thus, executable code is preferably not placed on devices with restricted capabilities or resources.

Further, the means for assigning may comprise means for distinguishing a device comprising sufficient resources from a device comprising restricted resources and wherein the means for assigning may be configured to assign an executable code to a non-involved device only if sufficient resources are not available on the involved restricted resources device (e.g. due to physical resource limitation or resource exhaustion by other executable code). In an embodiment for networked control systems being based on 802.15.4/ZigBee or similar technology with parent child relationships and/or resource restricted devices similar to ZigBee end devices, the device comprising sufficient resources may be the parent device of the resource restricted child device. According to another embodiment, the device comprising sufficient resources may be the router on a communication route between the involved devices.

According to an embodiment, the means for assigning may be configured to assign the plurality of executable codes to the specified devices such that a communication cost on a device comprising restricted resources is minimized. This allows sparing the limited resources of resource restricted devices.

Further, the means for assigning may be configured to assign the plurality of executable codes to the specified devices such that a communication cost over all of the plurality of devices is minimized. This allows reducing the energy consumption in the networked control system.

The means for assigning may be further configured to assign the plurality of executable codes to the specified devices according to a number of placing rules, so that if using one placement rule there are not enough resources on the specified devices, another placement rule is used for at least one executable code.

The compiler may be adapted for a networked control system being based on 802.15.4/ZigBee or similar technology with parent child relationships, wherein the plurality of devices comprise at least one child device and at least one parent device the child device is associated to and wherein the means for assigning is configured to assign at least one of the plurality of executable codes to the parent device if the child device is involved when the at least one of the plurality of executable codes is executed.

The networked control system may comprise at least one router and the means for assigning may be configured to assign at least one of the plurality of executable codes to the router if the router is connected to at least one device being involved when the at least one of the plurality of executable codes is executed.

According to a further embodiment of the invention, a compiler for a networked control system comprising a plurality of devices is provided, comprising:
means for translating a control logic into an executable code program;
means for partitioning the executable code program into a plurality of executable codes; and
means for assigning the plurality of executable codes according to a placing rule to specified devices of the plurality of devices.

According to a further embodiment of the invention, a networked control system is provided, comprising:
a plurality of devices; and
a compiler according to an embodiment of the invention.

According to a further embodiment of the invention, a compiling method for a networked control system comprising a plurality of devices is provided, comprising:
partitioning a user-specified control logic into a plurality of functional control logic programs;
translating the plurality of functional control logic programs into a plurality of executable codes; and
assigning the plurality of executable codes to specified devices of the plurality of devices according to a placing rule.

The steps of partitioning, translating and assigning may be performed iteratively. This allows an optimisation of the compilation process.

According to an embodiment, the iteratively performed steps may be performed during a compilation process of the user-specified control logic, during an installation process of the executable codes and/or during execution of the executable codes. This allows for including information gathered during compilation, installation or execution into the compilation process.

According to a further embodiment of the invention, a compiling method for a networked control system comprising a plurality of devices is provided, comprising:
translating a control logic into an executable code program;
partitioning the executable code program into a plurality of executable codes; and
assigning the plurality of executable codes according to a placing rule to specified devices of the plurality of devices.

According to an embodiment of the invention, a computer program may be provided, which is enabled to carry out the above methods according to the invention when executed by a computer. This allows realizing the inventive approach in a compiler program.

According to a further embodiment of the invention, a record carrier storing a computer program according to the invention may be provided, for example a CD-ROM, a DVD, a memory card, a diskette, or a similar data carrier suitable to store the computer program for electronic access.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

In the following, functional similar or identical elements may have the same reference numerals.

Figure 1:
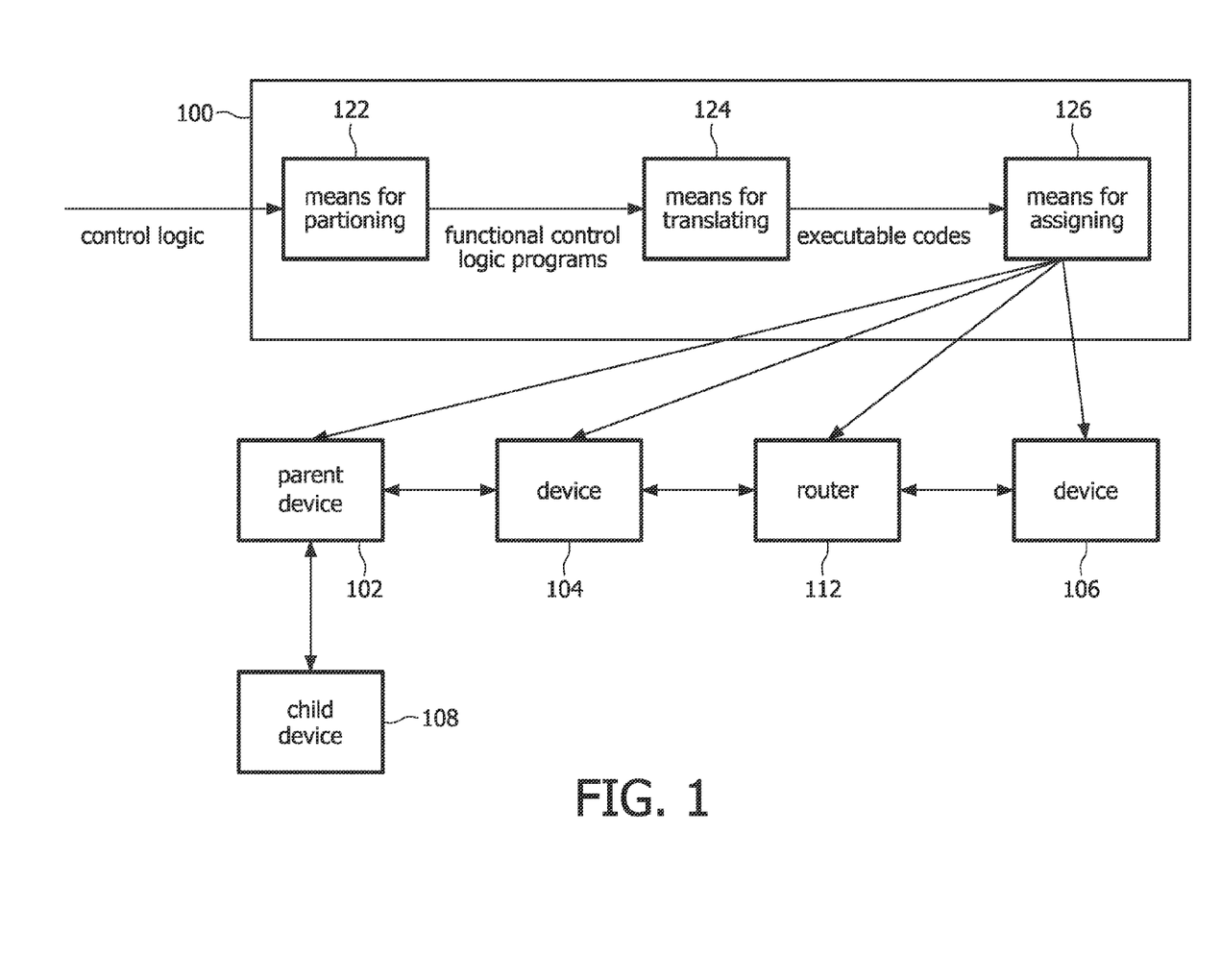
FIG. 1 shows a compiler in a networked control system according to the invention.

FIG. 1 shows a networked control system comprising a compiler 100 and a plurality of devices 102, 104, 106, 108, 112. The device 102 is a parent device and the device 108 is a child device connected to the parent device 102. The device 112 is a router. The devices 104, 106 are connected by the router 112. The device 102 is connected to the device 104. The devices 102, 104, 106, 108, 112 and the compiler are connected by a communication system, like a wireless communication system.

The compiler 100 is an apparatus for compiling which is configured to perform a method for compiling which is described by a compiler program. The compiler 100 is configured to receive control logic and to output executable code. The control logic is a user-specified control logic. The executable code is generated from the control logic by the compiler. The compiler is further configured to assign the generated executable code to at least one specified device of the plurality of devices 102, 104, 106, 108, 112. The compiler 100 comprises means for partitioning 122, means for translating 124 and means for assigning 126.

The means for partitioning 122 are configured to receive the control logic and to partition the control logic into a plurality of functional control logic programs. For example the means for partitioning partition the control logic into two or more functional control logic programs. The means for partitioning 122 are further configured to provide the functional control logic programs to the means for translating 124.

The means for translating 124 are configured to receive the functional control logic programs and to translate each received functional control logic program into a corresponding executable code. The means for translating 124 are further configured to provide the generated executable codes to the means for assigning 126.

The means for assigning 126 are configured to receive the executable codes and to assign each executable code to at least one of the plurality of devices 102, 104, 106, 108, 112. The means for assigning 126 are configured to select a specified device to which an executable code is assigned to, in accordance with a placing rule. The placing rule defines which one of the plurality of devices 102, 104, 106, 108, 112 is a specified device for all or for a particular of the executable codes. The placing rule may comply with one or a plurality of optimization criteria. For this, the compiler may have access to detailed information on the system, applications and/or the particular devices.

The means for partitioning 122 are configured to partition the control logic in accordance with a partitioning rule. The partitioning rule depends on the placing rule. This allows partitioning particular control logic dependent on the specified device or the plurality of specified devices the corresponding executable code or executable codes are to be assigned to by the means for assigning 126. In case a specified device comprises, for example, enough resources, the means for partitioning 122 may not partition received control logic at all but generate a single functional control logic program from the received control logic.

In one embodiment, the means for assigning 126 are configured to assign an executable code to a specified device being involved in the executable code. For example, the devices 104, 106 are involved in a particular executable code because 104 is the master of the input state variable(s) and device 106 is the master of the output state variable(s). Thus, the means for assigning 126 assign the particular executable code to the device 104 or the device 106 in order to comply with the placing rule.

The means for assigning 126 may also be configured to assign an executable code on a specified device comprising sufficient resources for executing the assigned executable code. The means for assigning 126 may comprise means for distinguishing (not shown in FIG. 1) a device comprising sufficient resources from a device comprising restricted resources. For example in a networked control systems being based on 802.15.4/ZigBee or similar technology with parent child relationships, the parent device 102 may comprise sufficient resources. Contrary thereto, the child device 108 may be a device comprising restricted resources or capabilities. The means for assigning 126 may preferably assign the executable code to the parent device 102 and not to the child device 108. The means for assigning 126 may in particular assign the executable code to the parent device 102 if the child device 108 hosts the master instance of the executable code output state variable.

According to a further embodiment, the means for assigning 126 may be configured to assign an executable code to the router 112. In particular the means for assigning 126 may assign the executable code to the router 112 if at least one of the devices 104, 106 being connected to the router 112 is involved in the corresponding executable code.

According to a further embodiment, the means for assigning 126 may be configured to assign an executable code such that communication costs on a particular device are minimized. In particular it may be advantageous to minimize communication costs on a device comprising restricted resources. Further, the means for assigning 126 may be configured to assign executable codes such that communication costs over all devices 102, 104, 106, 108, 112 are minimized.

According to a further embodiment, an (ordered) combination of rules may be used by means for assigning 126.

The networked control system shown in FIG. 1 is chosen exemplarily only. It may comprise any configuration necessary to comply with requirements of a field of operation the networked control system is intended for.

According to a further embodiment, the position of the means for translating 124 and the means for partitioning 122 may be interchanged within the compiler 100. Thus, the means for translating may translate the received control logic into an executable code program. Afterwards, the means for partitioning may partition the executable code program into a plurality of executable codes and the means for assigning may assign the plurality of executable codes according to a placing rule to specified devices of the plurality of devices.

According to a yet further embodiment, steps of translating, partitioning and assigning may be repeated iteratively.

A networked control system according to the invention may be based on a system, which allows for simple, compact, and flexible control logic design for networked control systems. This may be possible due to the transport of control-related data, simple and transparent to the application code itself. The control logic may be specified by a user on the collection of all or selected devices in the target networked control system, without the need to consider communication-related aspects. Then, as part of logic compilation, the executable runtime code may be assigned to devices by a computer-controlled or automated process, optimizing the target networked control system with respect to device and/or network capabilities or resources. Subsequently, support logic, covering the distribution aspects, may be automatically added.

In other words the networked control system according to the invention may comprise a system that enables development and establishment of control applications independent of distribution aspects, thereby reducing the complexity of the control logic, as a user sees it, and the logic design process. Further a free allocation of control logic to devices may be enabled, which allows for computer-controlled or automated system optimization after application development. Such a system may allow also non-technical users to define and setup control logic easily and in an optimal way.

The process of designing control logic and setting up the system may be done in the following steps.

Logic Design by the user or designer may include development of control logic on the collection of all device logic in the target system ("design view") without specifying the device the related runtime code will be executed on in the runtime system. The logic design may be done using graphical tools.

Compilation which may be performed automatically may include translation of the control logic programs into executable (control logic) code (called Executors) for the runtime system, e.g. byte code, including assignment of the executable codes to devices, the executable codes shall be executed on during operation. Compilation may further include instantiation of support logic realizing the communication of information necessary for running the executable codes.

System setup may include, besides typical steps of network and application configuration, also an upload of the executable codes to the assigned devices.

System maintenance may include easy addition of new control logic to the target system after start-up by simply repeating the above steps with the new logic and downloading it accordingly without the need to change the control logic already in the system.

Figure 2:
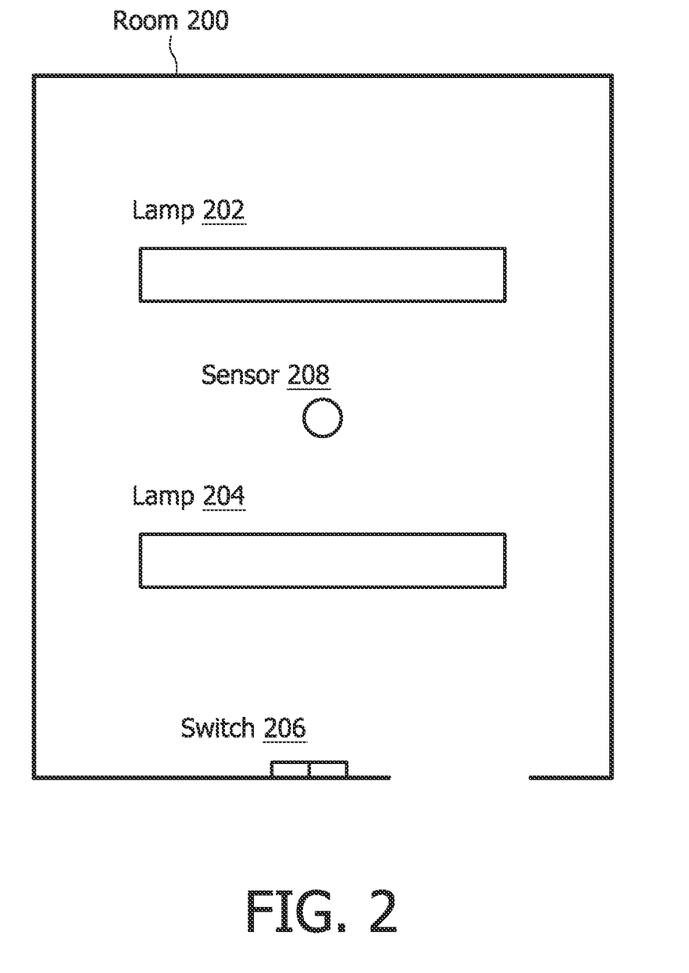
FIG. 2 shows an exemplary networked controlled lighting system according to the invention.

For the purpose of illustration, two exemplary scripts for a networked controlled lighting system are described in the following, for an exemplary system depicted in FIG. 2.

The examples are represented in descriptive, user-readable language. A user-readable language is chosen for better understandability only and shall by no means be indicative to the syntax of a logic design scripting language.

Example 1: "occupancy sensor 208 in room 200 turns the lamps 202 and 204 on/off, while the switch 206 defines the dimming level".

The switch 206, the sensor 208 and the lamps 202, 204 may be devices as shown in FIG. 1.

The intended device behaviour is independent of the device logic location. For example in a networked controlled lighting system, a script "occupancy sensor 208 in room 200 turns the lamps 202 and 204 on/off while the switch 206 defines the dimming level" may be assigned, as one executable code or a number of derivative executable codes, to be executed on runtime. For example the executable code or executable codes may be placed on the switch 206, on occupancy sensor 208, on either of the lamps 202, 204, on any other device inside or outside room 200, e.g. a central device, or any selected set of them without changing the intended behaviour of the controlled devices.

For the designed control logic (user's script), specified on the whole system, without considering the distribution aspects, the compilation includes the following steps of logic partitioning, logic assignment, of the particular pieces to devices and logic compilation, i.e. translation into runtime code.

The compiler may work script by script.

The partitioning of the script may have the goal of separating consistent pieces of logic, relating to a particular rule, behaviour or location, called control logic programs, in a step of logic partitioning.

Whether partitioning of a control logic program is needed, may be defined by rules, e.g. memory unit size available on the device, e.g. 64B page. There may be various criteria for the partitioning of logic, e.g. according to the desired functionality or the involved devices. E.g. the exemplary script of Example 1 may be further divided into two separately assignable scripts in one of the following ways:

Example 1.1: "occupancy sensor 208 in room 200 turns the lamps 202 and 204 on/off" and "switch 206 defines the dimming level of lamps 202 and 204".

Example 1.2: "occupancy sensor 208 in room 200 turns lamp 202 on/off, while the switch 206 defines the dimming level" and "occupancy sensor 208 in room 200 turns the lamp 204 on/off, while the switch 206 defines the dimming level".

The control logic programs are to be assigned to the devices the runtime code should run on, in a step of logic assignment. The logic assignment may be defined by a user for all or some control logic programs.

In an embodiment, default rules for logic assignment may be defined. For example, the application logic may only be assigned to involved devices, i.e. devices which hold the master instance of one of involved state variables. Involved state variables may be either input or output state variables used by the application logic. Furthermore, by default the logic may be assigned always to that device, which e.g. holds the master instance of the executable code output state variables.

Example 1.2.1: With the above prerequisites, the two scripts from example 1.2 will have to be assigned to lamp 202 and 204, respectively.

In another embodiment, the capabilities or resources of the devices may be taken into account by the logic assignment process. For this, detailed information about the capabilities of each individual device is required.

The device characteristics to be taken into account by the compiler may include a CPU power, available memory, incl. non-volatile memory, program memory and random-access memory; a sleeping behaviour, a proxying capability or requirement, or a power source.

For power source evaluation, the rule could be that executable codes are preferably assigned to mains powered devices.

Example 1.2.2: if switch 206 and occupancy sensor 208 are both battery-powered devices, scripts from example 1.2 can only be assigned to lamps 202, 204.

In one embodiment, information on capabilities or resources of the devices may be available to the compiler prior to logic assignment, e.g. as a result of system inventory.

In another embodiment, for certain device characteristics, such as memory, the chain of logic partitioning-assignment-compilation-installation steps may be an iterative process. According to this embodiment, the compiler first assigns the logic according to some generic rules, e.g. type of involved device.

For example, on installation, the size of the resulting executable code may be checked in order to determine whether the executable code fits into the available device memory. The step of checking may be performed either by the compiler or the device itself. If the memory size is exceeded, the logic partitioning-assignment-compilation-installation process may be iterated.

In yet another embodiment, the logic assignment may be optimized with respect to communication cost per device, including the energy costs of sending a packet, of waiting awake and listening for acknowledgement frames to be received, and the eventual re-transmission costs. Optimization with respect to communication cost may require additional information. Such additional information may include which technology, like 802.15.4 or ZigBee, is used; what is the available bandwidth and the expected delay. Further, information about a device role like a ZigBee Router (ZR) or a ZigBee End Device (ZED), a list of device neighbours, including information about parent-child relationships, a quality of particular links (LQI) or a length and cost of a routing path may be of importance. The length of the routing path may be defined by a number of hops.

Example 1.2.3: in example 1.2.1, each of the battery-powered devices (206, 208) sends two updates, one to each of the lamps 202, 204. The power consumption per battery-powered device 206, 208 could be further limited by limiting the number of packets sent, if both scripts from example 1.2 are assigned to one lamp, e.g. lamp 202. Thus, each of the battery-powered devices 206, 208 has only to send one packet to lamp 202, which in turn will control lamp 204.

For optimizing device communication costs, beside device's capabilities or resources, criteria taken into account may include intended device behaviour as defined by the application logic, e.g. the frequency of sending out attribute updates.

Example 1.2.4: if the occupancy sensor 208 from example 1 would be scheduled to measure and report the occupancy status every 50 ms, it would be very desirable to limit the amount of traffic generated by this sensor. At minimum, the solution as described in example 1.2.3 could be used, i.e. the sensor will report only to one of the lamps and the lamp will update the other lamp only on substantial light level changes. Alternatively, the executors resulting from the script in example 1 could be assigned to the occupancy sensor itself, so that the sensor will update both lamps only on substantial light level changes and when the light switch is on.

The described device communication costs optimisation is done on top of any performance-influencing means available to a system designer. For example by introducing conditional updates, e.g. based on absolute or relative attribute values change or maximum change notification frequency.

In a yet further embodiment, the total cost of the application and support logic execution for the entire system may be optimized. For optimization criteria like a total memory size required on all devices for storing application and support logic, for example in KB, a total application and support logic execution cost, for example in CPU cycles or power consumption or a total communication cost for all devices, e.g. in number of packet-hops, required transmission time (delay) and/or bandwidth may be taken into account for optimization.

A selection of the optimization criteria may depend on a most critical system aspect. For example, if the bandwidth is the most critical system resource, the bandwidth usage should be optimized. This may be the case of lower 802.15.4 frequency band around 900 MHz, providing the bandwidth of 20 or 40 kbps. Upper 802.15.4 frequency bands (around 2400 MHz) on the other hand, providing bandwidth of 250 kbps, could e.g. be optimized for battery lifetime.

Example 1.2.5: Assuming the two scripts from example 1.2 are assigned each to one lamp 204, 206, four update messages will have to be sent in total, resulting in two executable codes being triggered. If the logic from example 1.2 would be allocated to one of the lamps, there would be only one executable code triggered and three messages would have to be sent in total.

In yet another embodiment, the above logic assignment approaches may be combined. For example by default, logic would be assigned to any of the involved devices, taking this device's capabilities or resources into account. If that turns out to be impossible, the logic is assigned to any third, uninvolved device in such a way, that total cost for the entire control system is optimized, e.g., limiting the total number of hops the updates have to travel in the system. The latter may e.g. be achieved by assigning the application logic to, e.g. in ZigBee environment, the parent of the involved ZigBee EndDevice or any router on a route between the involved devices.

As part of the executable runtime code generation procedure, the application logic must be compiled to produce executable runtime code in a logic compilation step.

In one embodiment, the compilation of the application logic into runtime executable codes may happen after the application logic is partitioned and assigned. This simplifies an instantiation of application support logic, e.g. subscription information, if such an instantiation is also to be done by the compiler.

In another embodiment, the compilation of the application logic into runtime executable codes may happen before the application logic is partitioned and assigned. Thus, the exact size of each particular executor is known, which can be used, e.g. to optimize the logic assignment with respect to the device's available memory.

Summarized particular embodiments of the invention describe:

A networked control system in which a compiler program automatically partitions user-specified control logic into functional control logic programs, that are translated into executable code, and assigns the executable code to devices (that will execute it on runtime) in an optimized manner taking device capabilities/resources into account, A compiler program as above, using the following assignment optimization criteria:

preferably placing the executable code on one of the involved devices;

preferably placing the executable code on the device hosting the master instance of the executor output state variable, else, if 802.15.4/ZB or similar technology with parent child relationships is used, on the parent of the involved reduced function device, e.g. ZigBee End Device, esp. if that ZigBee End Device hosts the master instance of the executor output state variable, else on any router on the route between the involved devices;

preferably not placing executable code on device with restricted capabilities/resources, such as power source, CPU power, available memory (incl. non-volatile memory), sleeping behaviour, proxying capability/requirement, etc.;

preferably placing executable code so that the communication cost per resource-restricted devices is minimized;

preferably placing executable code so that the total communication cost (e.g. in terms of energy consumption, delay or bandwidth) over all devices is minimized.

A compiler program as above, partitioning the user-specified control logic so, that the above described optimal control logic program assignment is possible.

The above compiler program for a networked control system, where the steps are done iteratively:

partly on compilation, partly on installation, opt. also partly on operation time.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A building automation network control processor for compiling information from a building automation networked control system including a plurality of connected building devices, the building automation network control processor comprising: the building automation network control processor configured for partitioning a control logic into one or more functional control logic programs, wherein the control logic describes the operation of one or more of the plurality of connected building devices and wherein the functional control logic programs are portions of the control logic relating to a function or types of building devices, translating the plurality of functional control logic programs into a plurality of executable codes and assigning the plurality of executable codes according to a placing rule to specified building devices of the plurality of building devices, wherein the building automation network control processor partitions the control logic according to a partitioning rule which depends on the placing rule, and determining, based on the placing rule, when the control logic needs to be partitioned and if a specified device meets a predetermined criteria, the control logic is not partitioned and a single functional control logic program is generated for the specified device from the received control logic, And further wherein the building automation network control processor assigns at least one of the plurality of executable codes to a specified device which hosts a master instance of a state variable involved in the at least one executable code and wherein the building automation network control processor distinguishes a building device comprising sufficient resources from a device comprising restricted resources and wherein the means for assigning is configured to assign an executable code to a device comprising restricted resources only if there is no device comprising sufficient resources available.

2. The building automation network control processor of claim 1, wherein the building automation network control processor distinguishes a building device comprising sufficient resources from a device comprising restricted resources and wherein the means for assigning is configured to assign an executable code assign to a non-involved device only if sufficient resources are not available on the involved restricted resources device.

3. The building automation network control processor of claim 1, wherein the building automation network control processor assigns the plurality of executable codes to the specified devices such that a communication cost on a building device comprising restricted resources is minimized.

4. The building automation network control processor of claim 1, wherein the building automation network control processor assigns the plurality of executable codes to the specified devices such that a communication cost over all of the plurality of building devices is minimized.

5. The building automation network control processor of claim 1, wherein the building automation network control processor assigns the plurality of executable codes to the specified devices according to a number of placing rules, so that if using one placement rule there are not enough resources on the specified devices, another placement rule is used for at least one executable code.

6. The building automation network control processor of claim 1 for a building automation networked control system being based on 802.15.4/ZigBee or similar technology with parent child relationships, wherein the plurality of building devices comprise at least one child device and at least one parent device the child device is associated to and wherein the means for assigning is configured to assign at least one of the plurality of executable codes to the parent device if the child device is involved when the at least one of the plurality of executable codes is executed.

7. The building automation network control processor of claim 1, wherein the networked control system comprises at least one router and wherein the means for assigning is configured to assign at least one of the plurality of executable codes to the router if the router is connected to at least one building device being involved when the at least one of the plurality of executable codes is executed.

8. A building automation network control processor for a networked control system including a plurality of connected building devices, said building devices including two or more device types, comprising: the building automation network control processor translating a control logic into an executable code program, wherein the control logic describes the operation of one or more of the plurality of building devices; partitioning the executable code program into a plurality one or more of executable codes, wherein the plurality of executable codes are portions of the executable code program relating to a function or types of building devices; and assigning the plurality of executable codes according to a placing rule to specified devices of the plurality of building devices, wherein the building automation network control processor partitions the control logic according to a partitioning rule which depends on the placing rule, and determining, based on the placing rule, when the control logic needs to be partitioned and if a specified device meets a predetermined criteria, the control logic is not partitioned and a single functional control logic program is generated for the specified device from the received control logic, And further wherein the building automation network control processor assigns at least one of the plurality of executable codes to a specified device which hosts a master instance of a state variable involved in the at least one executable code and wherein the building automation network control processor distinguishes a building device comprising sufficient resources from a device comprising restricted resources and wherein the means for assigning is configured to assign an executable code to a device comprising restricted resources only if there is no device comprising sufficient resources available.

9. Compiling method for a building automation networked control system comprising a plurality of connected building devices, said building devices including two or more device types, said compiling method comprising the steps of: in a building automation network control processor, partitioning a user-specified control logic into a plurality of functional control logic programs, wherein the control logic describes the operation of one or more of the plurality of device and wherein the functional control logic programs are portions of the control logic relating to a function or types of building devices; translating the plurality of functional control logic programs into a plurality of executable codes; and assigning the plurality of executable codes to specified devices of the plurality of building devices according to a placing rule, wherein the building automation network control processor partitions the control logic according to a partitioning rule which depends on the placing rule; and determining, based on the placing rule, when the control logic needs to be partitioned and if a specified device meets a predetermined criteria, the control logic is not partitioned and a single functional control logic program is generated for the specified device from the received control logic, And further wherein the building automation network control processor assigns at least one of the plurality of executable codes to a specified device which hosts a master instance of a state variable involved in the at least one executable code and wherein the building automation network control processor distinguishes a building device comprising sufficient resources from a device comprising restricted resources and wherein the means for assigning is configured to assign an executable code to a device comprising restricted resources only if there is no device comprising sufficient resources available.

10. Compilation method of claim 9, wherein the steps of partitioning, translating and assigning are performed iteratively.

11. Compilation method of claim 10, wherein the iteratively performed steps are performed during a compilation process of the user-specified control logic, during an installation process of the executable codes and/or during execution of the executable codes.

12. A computer-readable, non-transitory medium having stored therein instructions for causing a processing unit to execute a method for compiling information from a building automation networked control system including a plurality of connected building devices, said building devices including two or more device types, the medium comprising code for: partitioning a control logic into one or more functional control logic programs, wherein the control logic describes the operation of one or more of the plurality of devices and wherein the functional control logic programs are portions of the control logic relating to a function or types of building devices, translating the plurality of one or more functional control logic programs into a plurality of executable codes, and assigning the plurality of executable codes according to a placing rule to specified building devices of the plurality of building devices, wherein the building automation network control processor partitions the control logic according to a partitioning rule which depends on the placing rule; and determining, based on the placing rule, when the control logic needs to be partitioned and if a specified device meets a predetermined criteria, the control logic is not partitioned and a single functional control logic program is generated for the specified device from the received control logic, And further wherein the building automation network control processor assigns at least one of the plurality of executable codes to a specified device which hosts a master instance of a state variable involved in the at least one executable code and wherein the building automation network control processor distinguishes a building device comprising sufficient resources from a device comprising restricted resources and wherein the means for assigning is configured to assign an executable code to a device comprising restricted resources only if there is no device comprising sufficient resources available.

* * * * *